(12) United States Patent
Liu

(10) Patent No.: US 10,323,791 B1
(45) Date of Patent: Jun. 18, 2019

(54) DISPLACEMENT STRUCTURE FOR A SUPPORT FRAME

(71) Applicant: C.D. Great Furniture Co., Ltd., Taichung (TW)

(72) Inventor: Tseng-Lang Liu, Taichung (TW)

(73) Assignee: C. D. Great Furniture Co., Ltd., Taichung (TW)

( * ) Notice: Subject to any disclaimer, the term of this patent is extended or adjusted under 35 U.S.C. 154(b) by 0 days.

(21) Appl. No.: 16/001,594

(22) Filed: Jun. 6, 2018

(51) Int. Cl.
*F16M 13/02* (2006.01)
*A47B 21/02* (2006.01)
*F16B 2/06* (2006.01)
*F16M 11/04* (2006.01)
*F16M 11/12* (2006.01)
(Continued)

(52) U.S. Cl.
CPC .......... *F16M 13/022* (2013.01); *A47B 21/02* (2013.01); *F16B 2/065* (2013.01); *A47B 21/04* (2013.01); *A47B 2097/005* (2013.01); *A47B 2200/0076* (2013.01); *A47B 2200/0085* (2013.01); *F16M 11/041* (2013.01); *F16M 11/043* (2013.01); *F16M 11/125* (2013.01); *F16M 11/126* (2013.01); *F16M 11/2021* (2013.01); *F16M 11/2028* (2013.01); *F16M 11/2064* (2013.01); *F16M 2200/044* (2013.01); *F16M 2200/06* (2013.01); *F16M 2200/068* (2013.01)

(58) Field of Classification Search
CPC ............ A47B 21/04; A47B 2200/0085; A47B 2097/005; F16M 11/041; F16M 11/125; F16M 11/126; F16M 11/2021; F16M 11/043; F16M 11/2064; F16M 11/2028; F16M 13/022; F16M 2200/044; F16M 2200/068; F16M 2200/06; F16B 2/065
USPC ...... 248/629, 284.1, 286.1, 917; 361/679.22, 361/379.59
See application file for complete search history.

(56) References Cited

U.S. PATENT DOCUMENTS 4,160,536 A * 7/1979 Krogsrud ............... F16M 11/04
248/123.11
4,703,909 A * 11/1987 Dayton .................. F16M 11/14
248/280.11
(Continued)

FOREIGN PATENT DOCUMENTS

DE 4002691 A1 * 8/1991 ............. A47B 13/16
DE 9204550 U1 * 7/1992 ........... F16M 13/022
(Continued)

*Primary Examiner* — Eret C McNichols
(74) *Attorney, Agent, or Firm* — Wang Law Firm, Inc.

(57) ABSTRACT

A displacement structure for a support frame includes a fixing member and a slide member. The fixing member includes a first fixing portion, a connecting portion and a second fixing portion which are sequentially connected. The connecting portion has two ends connected to the first and second fixing portions, respectively, the first and second fixing portions are opposite to each other and separated by a clamping space which is provided for clamping a table plate. The slide member includes a first clamping portion fixed to one end of the stationary rod, and two opposite second clamping portions opposite to the first clamping portion. The first clamping portion and the second clamping portions are fixed together by a fixing bolt, there is a slide space between the first clamping portion and the second clamping portions, the first clamping portion and the second clamping portions clamp the first fixing portion.

7 Claims, 9 Drawing Sheets

(51) Int. Cl.
  *F16M 11/20* (2006.01)
  *A47B 21/04* (2006.01)
  *A47B 97/00* (2006.01)

(56) References Cited

U.S. PATENT DOCUMENTS

| | | | | |
|---|---|---|---|---|
| 4,844,387 A * | 7/1989 | Sorgi | ............... | F16M 11/10 108/5 |
| 4,969,625 A * | 11/1990 | Singer | ............... | B25H 1/0028 248/123.2 |
| 5,123,621 A * | 6/1992 | Gates | ............... | F16M 11/2014 248/184.1 |
| 5,553,820 A * | 9/1996 | Karten | ............... | A47B 21/0314 248/181.2 |
| 5,713,549 A * | 2/1998 | Shieh | ............... | F16M 11/18 248/284.1 |
| 5,799,917 A * | 9/1998 | Li | ............... | F16M 11/08 248/284.1 |
| 5,975,472 A * | 11/1999 | Hung | ............... | F16M 11/105 248/278.1 |
| 6,012,693 A * | 1/2000 | Voeller | ............... | F16M 11/048 248/279.1 |
| 6,394,403 B1 * | 5/2002 | Hung | ............... | F16M 11/10 248/276.1 |
| 6,478,275 B1 * | 11/2002 | Huang | ............... | F16M 11/08 248/278.1 |
| 6,592,090 B1 * | 7/2003 | Li | ............... | F16M 11/2092 248/284.1 |
| 6,672,553 B1 * | 1/2004 | Lin | ............... | F16M 11/08 248/276.1 |
| 6,769,657 B1 * | 8/2004 | Huang | ............... | F16M 11/10 248/278.1 |
| 7,264,212 B2 * | 9/2007 | Hung | ............... | F16M 11/10 248/184.1 |
| 7,389,965 B2 * | 6/2008 | Oddsen, Jr. | ............... | F16M 11/10 248/274.1 |
| 7,510,155 B2 * | 3/2009 | Huang | ............... | F16M 11/10 248/278.1 |
| 7,810,773 B2 * | 10/2010 | Chi | ............... | F16M 11/2064 248/121 |
| 8,162,271 B2 * | 4/2012 | Li | ............... | F16M 11/105 248/162.1 |
| 8,256,725 B2 * | 9/2012 | Wang | ............... | F16M 11/105 248/133 |
| 8,366,060 B2 * | 2/2013 | Hung | ............... | F16M 11/041 248/124.1 |
| 8,469,323 B1 * | 6/2013 | Deros | ............... | F16M 11/105 248/123.11 |
| 9,004,431 B2 * | 4/2015 | Huang | ............... | F16M 11/10 248/121 |
| 9,027,894 B2 * | 5/2015 | Sapper | ............... | F16M 11/08 248/274.1 |
| 9,033,292 B2 * | 5/2015 | Lu | ............... | F16M 13/022 248/123.11 |
| 9,113,708 B2 * | 8/2015 | Yang | ............... | A47B 97/00 |
| 9,702,397 B2 * | 7/2017 | Chen | ............... | B25H 1/12 |
| 9,804,652 B2 * | 10/2017 | Volek | ............... | G06F 1/1601 |
| 10,024,484 B2 * | 7/2018 | Brown | ............... | F16M 11/041 |
| 2003/0075653 A1 * | 4/2003 | Li | ............... | F16M 11/10 248/274.1 |
| 2004/0245419 A1 * | 12/2004 | Sweere | ............... | F16M 11/105 248/276.1 |
| 2005/0006542 A1 * | 1/2005 | Henning | ............... | F16C 11/10 248/274.1 |
| 2005/0205734 A1 * | 9/2005 | Wang | ............... | F16M 11/2064 248/276.1 |
| 2006/0157627 A1 * | 7/2006 | Hung | ............... | F16C 11/10 248/276.1 |
| 2007/0040084 A1 * | 2/2007 | Sturman | ............... | F16M 11/105 248/280.11 |
| 2007/0139870 A1 * | 6/2007 | Lin | ............... | F16M 11/10 361/679.22 |
| 2008/0029661 A1 * | 2/2008 | Chen | ............... | F16M 11/105 248/176.1 |
| 2008/0054133 A1 * | 3/2008 | Huang | ............... | F16M 11/105 248/178.1 |
| 2008/0164395 A1 * | 7/2008 | Chang | ............... | F16M 11/105 248/276.1 |
| 2009/0173869 A1 * | 7/2009 | Su | ............... | F16M 11/2064 248/629 |
| 2010/0148020 A1 * | 6/2010 | Wills | ............... | F16M 11/10 248/121 |
| 2010/0327129 A1 * | 12/2010 | Chen | ............... | F16M 11/14 248/121 |
| 2011/0303805 A1 * | 12/2011 | Lau | ............... | F16M 11/126 248/125.8 |
| 2012/0235000 A1 * | 9/2012 | Borloz | ............... | F16M 11/046 248/284.1 |
| 2012/0267497 A1 * | 10/2012 | Bowman | ............... | F16M 11/10 248/280.11 |
| 2014/0197289 A1 * | 7/2014 | Chen | ............... | F16M 13/022 248/214 |
| 2014/0367137 A1 * | 12/2014 | Leung | ............... | H02G 3/045 174/68.3 |
| 2015/0050077 A1 * | 2/2015 | Huang | ............... | F16B 21/125 403/322.1 |
| 2017/0152989 A1 * | 6/2017 | Gulanes | ............... | A61M 16/16 |
| 2018/0020825 A1 * | 1/2018 | Hung | ............... | A47B 21/02 108/31 |
| 2018/0112820 A1 * | 4/2018 | Lau | ............... | F16M 11/14 |
| 2018/0209582 A1 * | 7/2018 | Petts | ............... | F16M 11/041 |
| 2018/0344025 A1 * | 12/2018 | Corbo | ............... | A47B 21/04 |

FOREIGN PATENT DOCUMENTS

DE       9402835 U1 *  6/1994  ........... A47B 17/033
WO  WO-2004107913 A1 * 12/2004  ........... A47B 13/16

* cited by examiner

DISPLACEMENT STRUCTURE FOR A SUPPORT FRAME

BACKGROUND

Field of the Invention

The present invention relates to a screen mounting or supporting technique, and more particularly to a displacement structure for a support frame.

Related Prior Art

General office workers need to watch the computer screen for a long time, and when the screen is placed on the desktop, the height of the screen will become too high or too low because people are different in height from each other. Due to the fact that most office desks and chairs are of normal height, users have to put objects under the computer screen based on their own heights. Therefore, there is a screen support frame 10 on the market, which is mainly composed of a stationary rod 11 and a swing arm 12. The stationary rod 11 further includes a clamping portion 111 clamped on the edge of the table. The swing arm 12 has one end fixed to the stationary rod 11 and another end provided for fixing the computer screen. The swing arm 12 can swing freely so that the screen can be adjusted to different positions according to the needs of the user.

Figure 1:
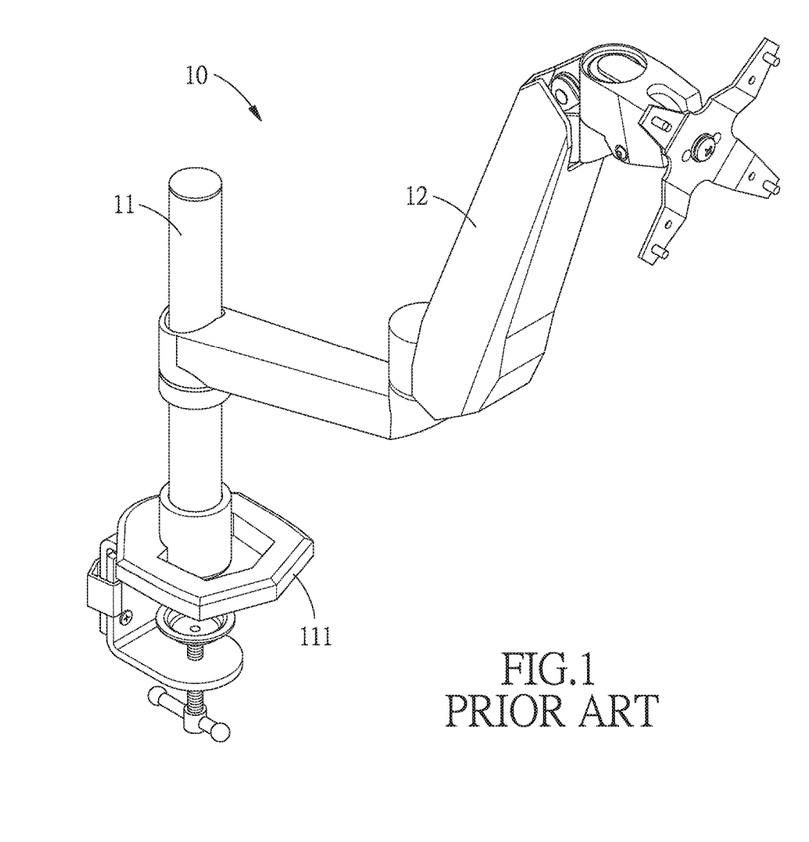
FIG. 1 is a perspective view of a conventional screen support frame.
Figure 2:
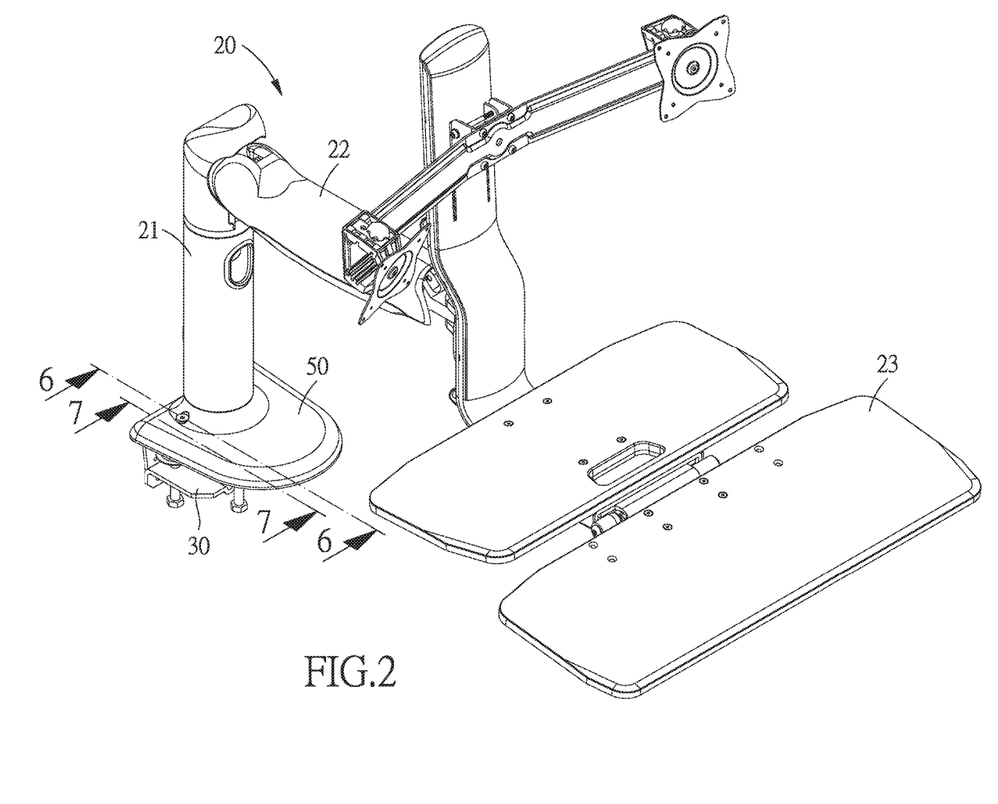
FIG. 2 is a perspective view of the displacement structure for a support frame in accordance with the preferred embodiment of the invention.
Figure 3:
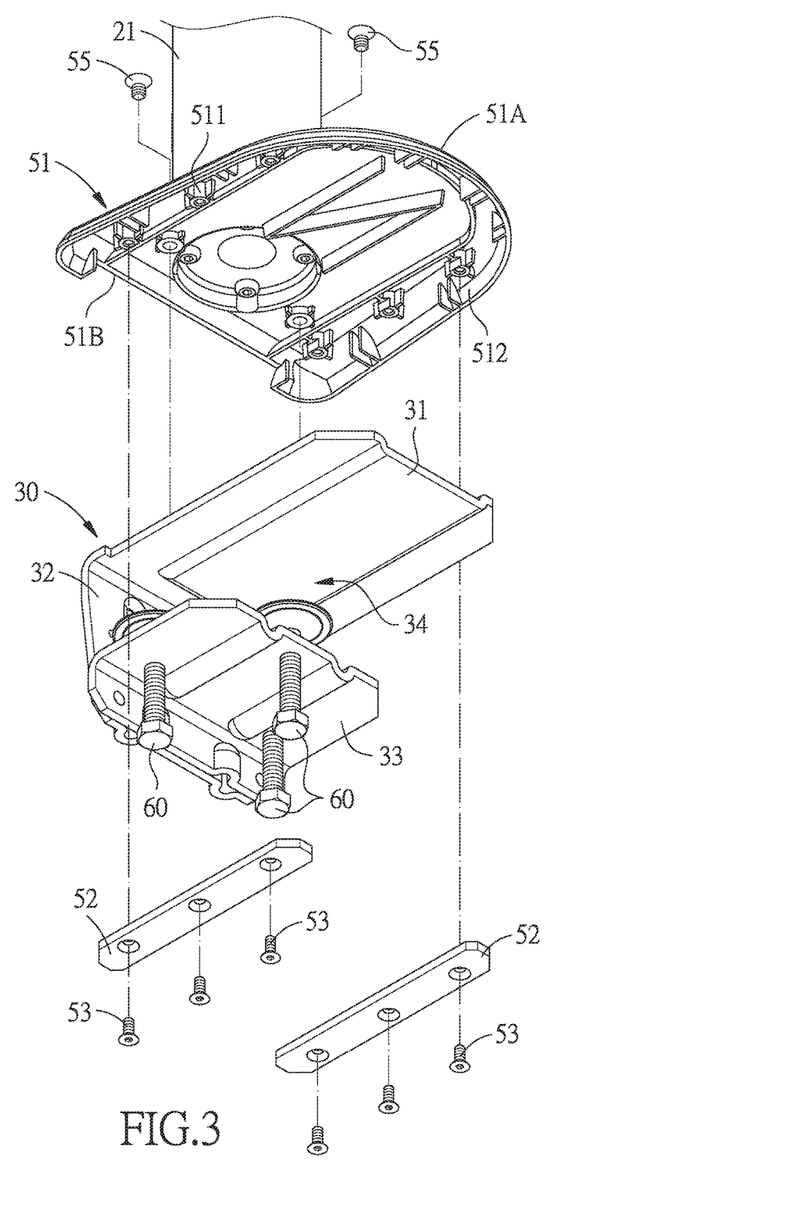
FIG. 3 is an exploded view of the displacement structure for a support frame in accordance with the preferred embodiment of the invention.
Figure 4:
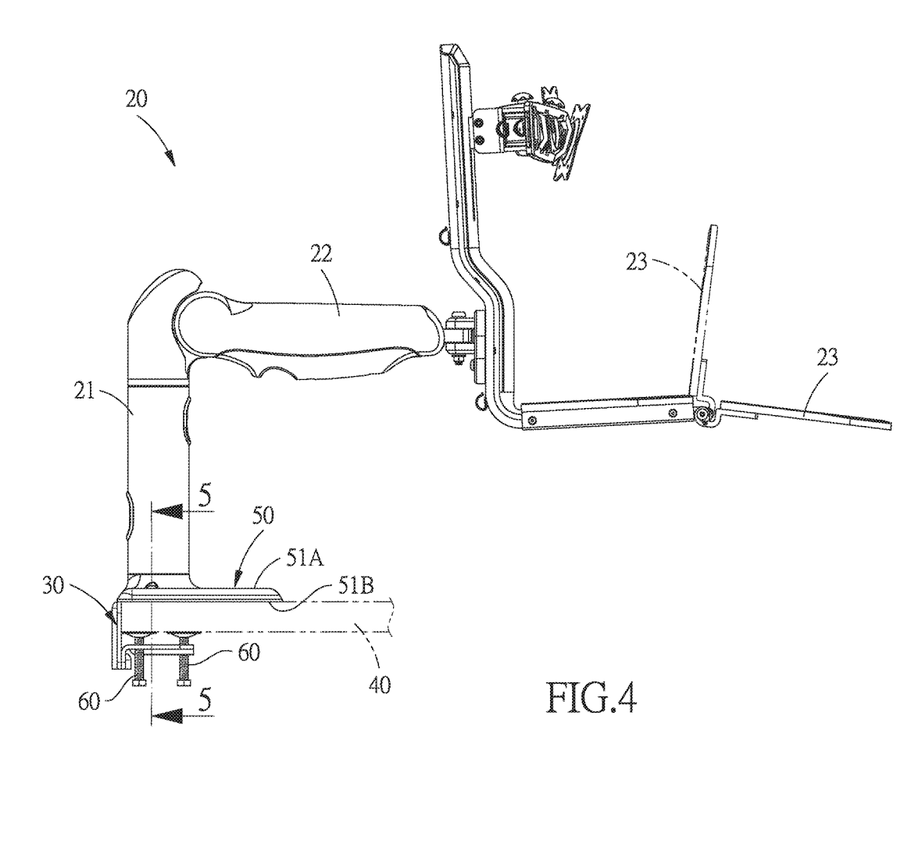
FIG. 4 is an illustrative view of the displacement structure for the support frame in accordance with the preferred embodiment of the invention.
Figure 5:
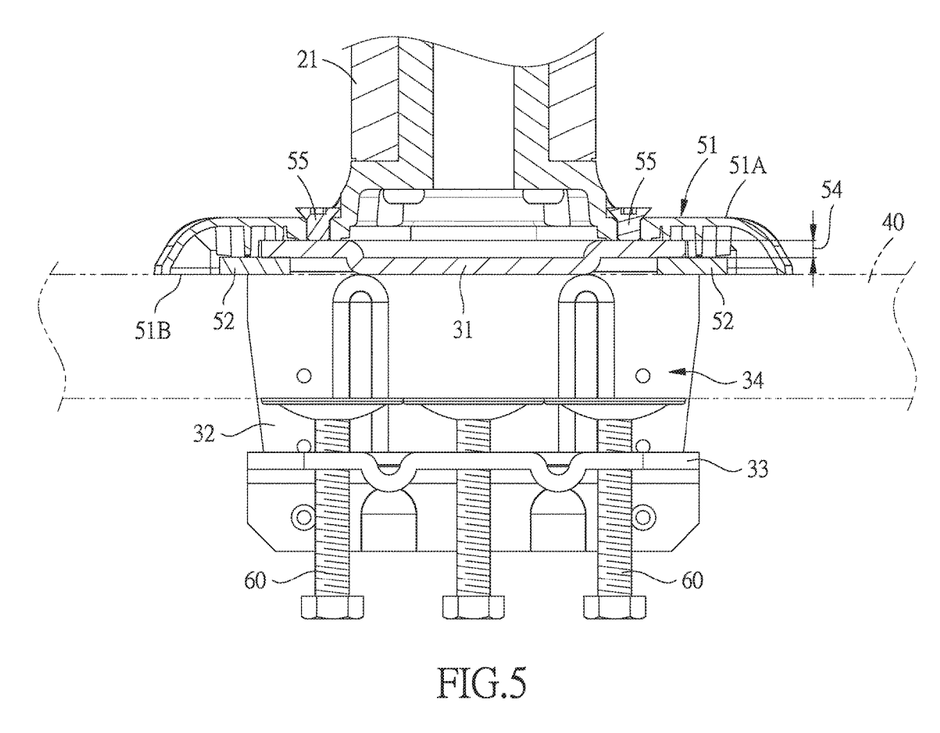
FIG. 5 is a cross sectional view taken along the line 5-5 of FIG. 4.
Figure 6:
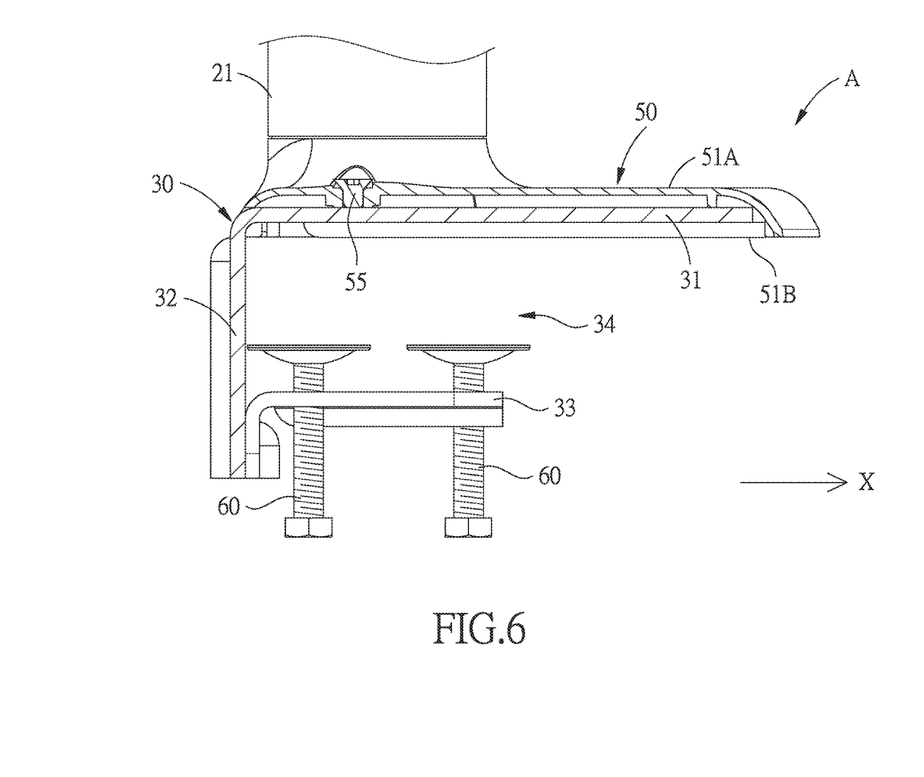
FIG. 6 is a cross sectional view of the displacement structure for the support frame in accordance with the preferred embodiment of the invention.
Figure 7:
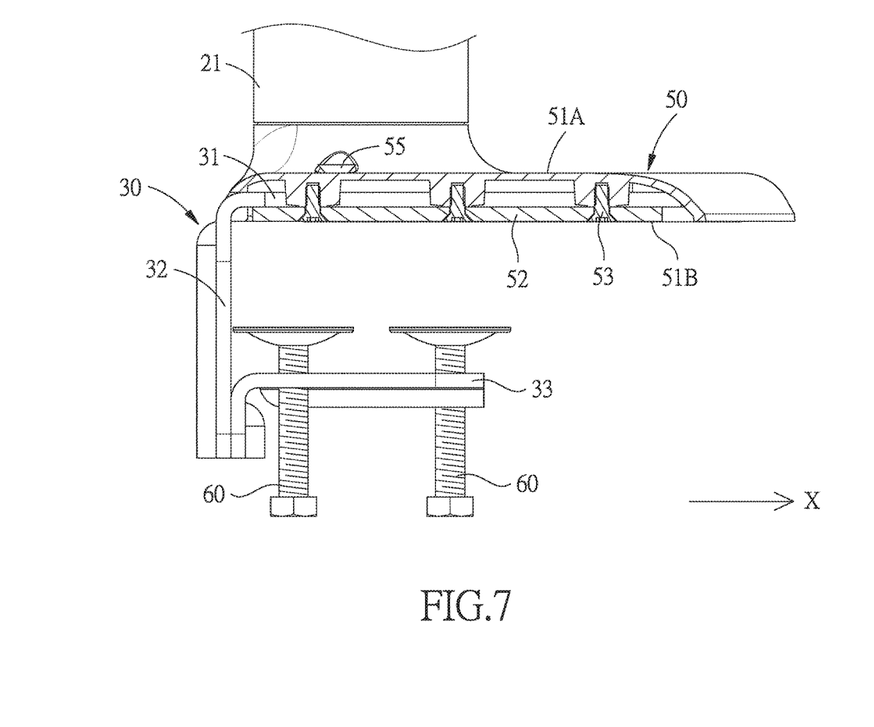
FIG. 7 is another cross sectional view of the displacement structure for the support frame in accordance with the preferred embodiment of the invention.
Figure 8:
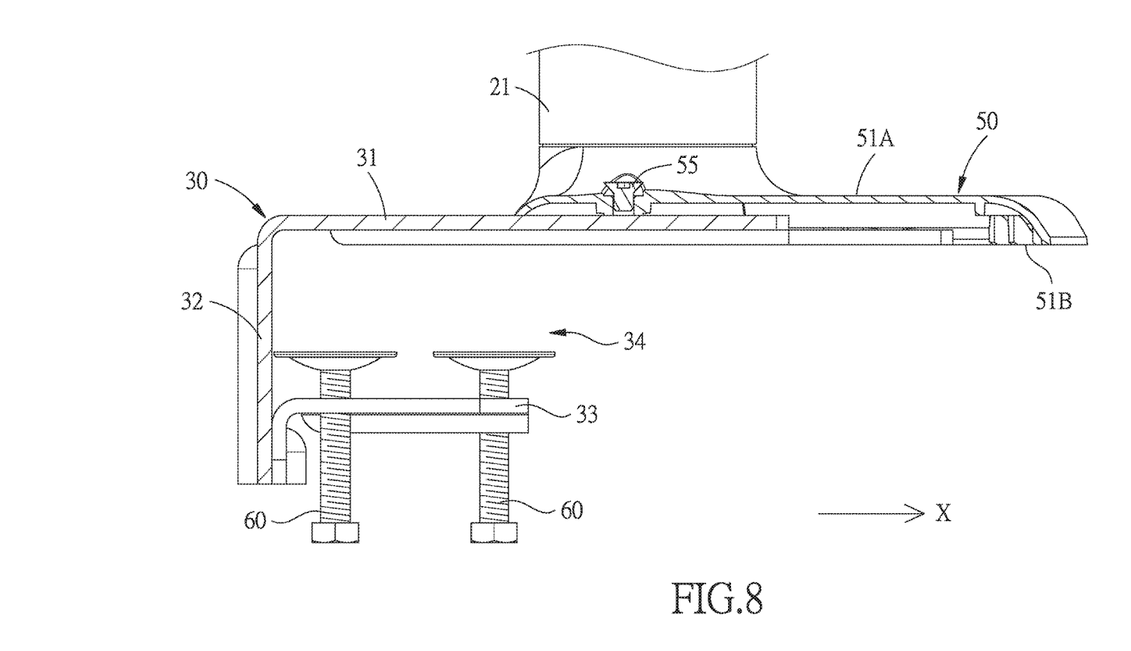
FIG. 8 is another cross sectional view of the displacement structure for the support frame in accordance with the preferred embodiment of the invention.
Figure 9:
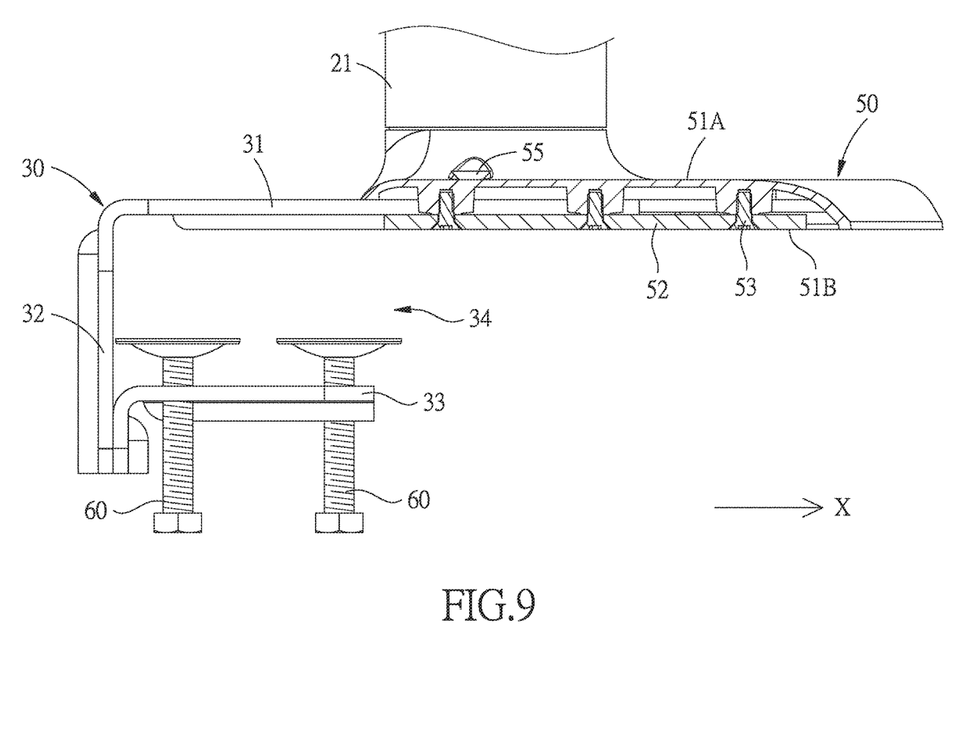
FIG. 9 is another cross sectional view of the displacement structure for the support frame in accordance with the preferred embodiment of the invention.

However, as shown in FIG. 1, the aforementioned screen support frame 10 is incapable of adjusting the position of the stationary rod 11, so that the screen support frame 10 is unable to move towards the user. When the screen support frame 10 is too far away from the user, if the user adjusts the swing arm 12 to bring the screen closer, the height of the screen will change due to the structure of the swing arm 12, resulting in difficulty for the user to adjust the screen support frame 10 to the most suitable position.

In view of the fact that the aforementioned screen support frame cannot be moved only towards the user, resulting in incapability of the screen support frame to move to the most suitable position, it is necessary to provide a displacement structure of the screen support frame to solve the problem that the screen support frame cannot be moved only towards the user.

SUMMARY

One objective of the present invention is to solve the disadvantage that the conventional screen support frame cannot be moved only towards the user. The present invention provides a displacement structure for a support frame, wherein the support frame can be adjusted to the most suitable position for the user to view.

To achieve the above objective, the invention provides a displacement structure for a support frame, wherein the support frame includes a stationary rod, and the displacement structure for the support frame comprises:

a fixing member including a first fixing portion, a connecting portion and a second fixing portion which are sequentially connected, in such a manner that the connecting portion has two ends connected to the first and second fixing portions, respectively, the first and second fixing portions are located towards each other and separated from each other by a clamping space which is provided for clamping a table plate; and a slide member including a first clamping portion with a first surface fixed to one end of the stationary rod, and a second clamping portion opposite to the first clamping portion, the first clamping portion has a second surface fixed to the second clamping portion by a fixing bolt, there is a slide space between the first clamping portion and the second clamping portion, the first clamping portion and the second clamping portion clamp the first fixing portion, and the first fixing portion is located in the slide space.

In a preferred embodiment, the first clamping portion includes a first lateral side and an opposite second lateral side, and there are two said second clamping portions located on the first and second lateral sides, respectively.

In a preferred embodiment, the first and second fixing portions each have one end fixed to the connecting portion, and both extend in the same direction.

In a preferred embodiment, the two second clamping portions are fixed to the first clamping portion by six fixing bolts, and both located on the second surface of the first clamping portion opposite the first surface.

In a preferred embodiment, three pressing bolts are inserted in the second fixing portion and capable of moving towards or away from the first fixing portion, and the table plate is located between the first and second fixing portions.

In a preferred embodiment, the slide member further includes two positioning bolts inserted through the first surface of the first clamping portion and stopped against the first fixing portion, so as to fix the slide member.

In a preferred embodiment, a position where the second clamping portion comes into contact with the connecting portion is an initial position, and the slide member is capable of moving from the initial position by 100 mm.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Referring to FIGS. 2-9, a displacement structure for a support frame 20 in accordance with the preferred embodiment of the invention is suitable for a table plate 40, the support frame 20 includes a stationary rod 21, and the displacement structure for the support frame 20 comprises: a fixing member 30 and a slide member 50.

The fixing member 30 includes a first fixing portion 31, a connecting portion 32 and a second fixing portion 33 which are sequentially connected, in such a manner that the connecting portion 32 has two ends connected to the first and second fixing portions 31, 33, respectively. The first and second fixing portions 31, 33 each have one end fixed to the connecting portion 32, and both extend in the same displacement direction X, so that the first and second fixing portions 31, 33 are located towards each other, and thus the fixing member 30 is approximately U-shaped. The first and second fixing portions 31, 33 are separated from each other by a clamping space 34 which is provided for clamping the table plate 40.

The slide member 50 includes a first clamping portion 51 with a first surface 51A fixed to one end of the stationary rod 21, and two second clamping portions 52 opposite to the first clamping portion 51. The first clamping portion 51 includes a first lateral side 511 and an opposite second lateral side 512. The two second clamping portions 52 are fixed to the first and second lateral sides 511, 512, respectively, by six fixing bolts 53, and both located on a second surface 51B of the first clamping portion 51 opposite the first surface 51A. There is a slide space 54 between the first clamping portion 51 and the second clamping portions 52, the first clamping portion 51 and the second clamping portions 52 clamp the first fixing portion 31, and the first fixing portion 31 is located in the slide space 54, so that the slide member 50 is able to move along the displacement direction X. In this embodiment, the position where the second clamping portions 52 come into contact with the connecting portion 32 is an initial position A, and the slide member 50 is capable of moving from the initial position A along the displacement direction X by 100 mm.

In this embodiment, the direction of the first fixing portion 31 extending to the second fixing portion 33 is a perpendicular direction Y.

Three pressing bolts 60 are inserted in the second fixing portion 33 and capable of moving along the perpendicular direction Y. The table plate 40 is located between the first and second fixing portions 31, 33, and then the pressing bolts 60 move along the perpendicular direction Y towards the first fixing portion 31 until they are pressed tightly against the table plate 40, so that the fixing member 30 is fixed to the table plate 40.

The slide member 50 further includes two positioning bolts 55 inserted through the first surface 51A of the first clamping portion 51 and stopped against the first fixing portion 31, so as to fix the slide member 50.

Preferably, the support frame 20 further includes a swing arm 22 and a carrying portion 23. The swing arm 22 has one end pivotally connected to the stationary rod 21, and another end provided with the carrying portion 23. The carrying portion 23 is pivotally connected to the swing arm 22 and provided for holding a keyboard for the user, so that the user can adjust the angle of the keyboard placed on the carrying portion 23 by turning the carrying portion 23.

The above is the structural configuration of the present invention and its connection relationship. The usage of the present invention is as follows:

Referring to FIGS. 6-9, when the user wants to adjust the position of the slide member 50, the two positioning bolts 55 should firstly be loosened along the perpendicular direction Y, so that the slide member 50 is able to move along the displacement direction X. After adjusting the slide member 50 to a desired position, the user can screw the two positioning bolts 55 through the first clamping portion 51 until they press against the first fixing portion 31, so that the slide member 50 is fixed without being able to move along the displacement direction X.

By such arrangements, the user can fix the stationary rod 21 on the table plate 40 by using the fixing member 30, and can use the slide member 50 to move the stationary rod 21, so that the whole support frame 20 is able to move along the displacement direction X, and thus the user can adjust the support frame 20 to the appropriate position without affecting the height of the screen placed on the support frame 20.

While we have shown and described various embodiments in accordance with the present invention, it is clear to those skilled in the art that further embodiments may be made without departing from the scope of the present invention.

What is claimed is:

1. A displacement structure for a support frame, the support frame including a stationary rod, and the displacement structure for the support frame comprising:
   a fixing member including a first fixing portion, a connecting portion and a second fixing portion which are sequentially connected, in such a manner that the connecting portion has two ends connected to the first and second fixing portions, respectively, the first and second fixing portions are located towards each other and separated from each other by a clamping space which is provided for clamping a table plate; and
   a slide member including a first clamping portion with a first surface fixed to one end of the stationary rod, and a second clamping portion opposite to the first clamping portion, the first clamping portion has a second surface fixed to the second clamping portion by a fixing bolt, there is a slide space between the first clamping portion and the second clamping portion, the first clamping portion and the second clamping portion clamp the first fixing portion, and the first fixing portion is located in the slide space.

2. The displacement structure for the support frame as claimed in claim 1, wherein the first clamping portion includes a first lateral side and an opposite second lateral side, and there are two said second clamping portions located on the first and second lateral sides, respectively.

3. The displacement structure for the support frame as claimed in claim 2, wherein the two second clamping portions are fixed to the first clamping portion by six fixing bolts, and both located on the second surface of the first clamping portion opposite the first surface.

4. The displacement structure for the support frame as claimed in claim 1, wherein the first and second fixing portions each have one end fixed to the connecting portion, and both extend in the same direction.

5. The displacement structure for the support frame as claimed in claim 1, wherein three pressing bolts are inserted in the second fixing portion and capable of moving towards or away from the first fixing portion, and the table plate is located between the first and second fixing portions.

6. The displacement structure for the support frame as claimed in claim 1, wherein the slide member further includes two positioning bolts inserted through the first surface of the first clamping portion and stopped against the first fixing portion, so as to fix the slide member.

7. The displacement structure for the support frame as claimed in claim 1, wherein a position where the second clamping portion comes into contact with the connecting portion is an initial position, and the slide member is capable of moving from the initial position by 100 mm.

* * * * *